United States Patent
Kashiwada et al.

(10) Patent No.: US 8,431,210 B2
(45) Date of Patent: Apr. 30, 2013

(54) MASTER FOR PRODUCING STAMPER

(75) Inventors: Saori Kashiwada, Yokohama (JP); Yuichi Oshawa, Yokohama (JP); Junichi Ito, Yokohama (JP); Chikayoshi Kamata, Kawasaki (JP); Yoshiyuki Kamata, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/613,667

(22) Filed: Sep. 13, 2012

(65) Prior Publication Data
US 2013/0004724 A1 Jan. 3, 2013

Related U.S. Application Data

(63) Continuation of application No. PCT/JP2010/002454, filed on Apr. 2, 2010.

(51) Int. Cl.
*B32B 3/00* (2006.01)
*B32B 3/28* (2006.01)
*B32B 3/30* (2006.01)

(52) U.S. Cl.
USPC .................. 428/167; 428/156; 428/172

(58) Field of Classification Search .................. 428/156, 428/167, 172, 173, 426, 428, 446, 450, 688, 428/689, 701, 702
See application file for complete search history.

(56) References Cited

U.S. PATENT DOCUMENTS

| 5,501,926 A | 3/1996 | Cheng et al. |
| 6,653,057 B1 | 11/2003 | Koyama |
| 2003/0087186 A1 | 5/2003 | Sano |
| 2005/0127032 A1 | 6/2005 | Nakada et al. |

FOREIGN PATENT DOCUMENTS

| JP | 6-51495 | 5/1994 |
| JP | 2001-243665 | 9/2001 |
| JP | 2003-203396 | 7/2003 |
| JP | 2005-166105 | 6/2005 |
| JP | 2006-215052 | 8/2006 |

OTHER PUBLICATIONS

International Search Report for PCT/JP2010/002454 mailed Jun. 1, 2010.
U.S. Appl. No. 12/712,405.

*Primary Examiner* — Catherine A Simone
(74) *Attorney, Agent, or Firm* — Nixon & Vanderhye, P.C.

(57) ABSTRACT

In one embodiment, there is provided a master for producing a stamper. The master includes: a substrate made of a first material and comprising a first surface, wherein the first surface of the substrate is formed with a groove; a first layer made of a second material and formed in the groove, wherein the second material is different from the first material, and wherein a surface of the first layer is substantially flush with the first surface of substrate; and a projection portion formed on at least one of the first surface of the substrate and the surface of the first layer. The first material is silicon and the second material is selected from silicon oxide, aluminum oxide, titanium oxide, and glass.

10 Claims, 24 Drawing Sheets

FIG. 23

AVERAGE HEIGHT AND HEIGHT VARIATION OF PROJECTIONS OF MASTERS

| SUBSTRATE MATERIAL 1 | SUBSTRATE MATERIAL 2 | PROJECTION MATERIAL | AVERAGE HEIGHT OF PROJECTIONS | HEIGHT VARIATION OF PROJECTIONS |
|---|---|---|---|---|
| Si | SiO2 | Al2O3 | 15.0nm | 0.3nm |
| Si | TiO2 | SiO2 | 15.1nm | 0.2nm |
| NaSiO2 | Si | SiO2 | 15.0nm | 0.2nm |

AVERAGE HEIGHT AND HEIGHT VARIATION OF PATTERNS OF STAMPERS PRODUCED USING MASTERS

| SUBSTRATE MATERIAL 1 | SUBSTRATE MATERIAL 2 | PROJECTION MATERIAL | Ni CONDUCTING FILM | AVERAGE HEIGHT OF PATTERNS | HEIGHT VARIATION OF PATTERNS |
|---|---|---|---|---|---|
| Si | SiO2 | Al2O3 | NO PEELING | 15.5 | 0.6nm |
| Si | TiO2 | SiO2 | NO PEELING | 15.4 | 0.5nm |
| NaSiO2 | Si | SiO2 | NO PEELING | 15.4 | 0.6nm |

FIG. 24

NUMBER OF PEELED PROJECTIONS OF MASTER AFTER REPETITIVE PRODUCING OF Ni STAMPERS (10 TIMES)

| PROJECTION WIDTH | 5nm | 10nm | 15nm | 50nm |
|---|---|---|---|---|
| EXAMPLE 4 | 0 | 0 | 0 | 0 |
| COMPARATIVE EXAMPLE 3 | 34 | 8 | 0 | 0 |

MASTER FOR PRODUCING STAMPER

CROSS-REFERENCE TO RELATED APPLICATION

This is a Continuation Application of PCT Application No. PCT3P2010/002454, filed on Apr. 2, 2010, which was published as WO2011/125099 A1 under PCT Article 21(2) in Japanese, the entire contents of which are incorporated herein by reference.

BACKGROUND

1. Field

Embodiments described herein relate to a master for producing a stamper.

2. Description of the Related Art

JP-A-2005-166105 discloses a master for projection-recess pattern transfer in which projections are formed on a substrate made of a single material.

However, when a nickel electroforming layer formed on the master is removed from the master, the nickel electroforming layer tends to adhere to an underlying layer of the master too closely, resulting in low demoldability.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIG. 23 is tables illustrating evaluation results of masters of Example 2 according to the first embodiment; and FIG. 24 is a table illustrating evaluation results of masters of Example 4 according to the second embodiment.

DETAILED DESCRIPTION

Figure 1:
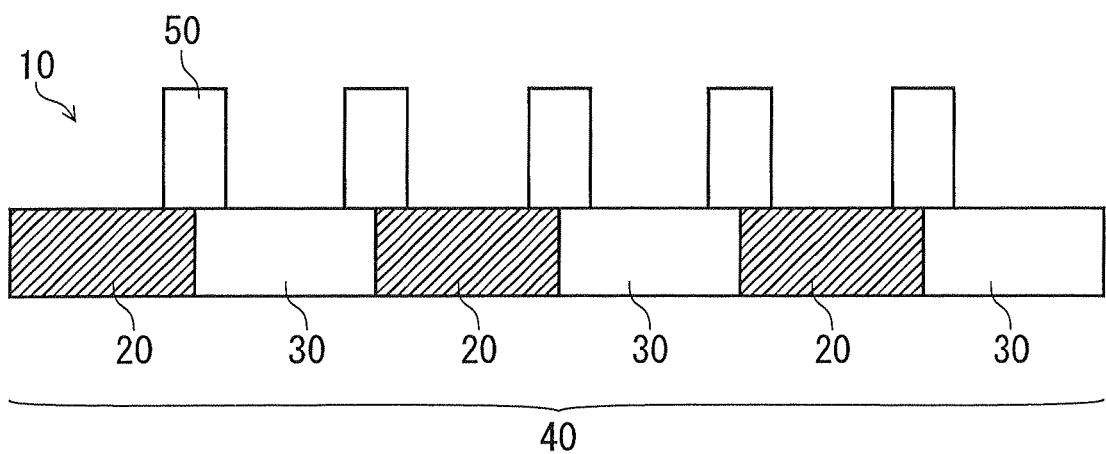
FIG. 1 shows a master for producing a stamper according to a first embodiment of the present invention.

According to an embodiment, there is provided a master for producing a stamper. The master includes: a substrate made of a first material and comprising a first surface, wherein the first surface of the substrate is formed with a groove; a first layer made of a second material and formed in the groove, wherein the second material is different from the first material, and wherein a surface of the first layer is substantially flush with the first surface of substrate; and a projection portion formed on at least one of the first surface of the substrate and on the surface of the first layer. The first material is silicon and the second material is selected from silicon oxide, aluminum oxide, titanium oxide, and glass.

Embodiments of the present invention will be hereinafter described with reference to the drawings. The same constituent elements are given the same reference symbol in the drawings, and will not be described redundantly.

The present invention is directed to a master for producing a stamper. The stamper is used for transfer of a nanometer-sized projection-recess pattern (that is, used for nano-imprinting).

Embodiment 1

A master 10 according to a first embodiment of the invention will be described below. FIG. 1 shows the master 10 according to the first embodiment.

As shown in FIG. 1, in the master 10 according to the embodiment, a substrate 40 is studded with a large number of projections 50 at certain intervals. The substrate 40 is configured in such a manner that two kinds of portions made of different materials (first material 20 and second material 30) are arranged alternately. Each projection 50 is formed at the boundary between two portions made of the different materials 20 and 30. In other words, the substrate 40 is made of the first material 20 and at least surface portions of the substrate 40 are made of the second material 30. Alternatively, the substrate 40 is made of the second material 30 and at least surface portions of the substrate 40 are made of the first material 20.

It suffices that even a very small portion of each projection 50 be located on the boundary between two portions made of the different materials 20 and 30. It is preferable that the projections 50 have approximately the same height.

The first material 20 is silicon which tends to adhere to a stamper (described later) closely, and the second material 30 is selected from silicon oxide, aluminum oxide, titanium oxide, and glass which do not tend to adhere to a stamper closely. The glass is amorphous glass containing $SiO_2$ and may contain impurities.

It is preferable that the height of the projections 50 as measured from the surface of the substrate 40 be 10 to 40 nm and that their width be less than or equal to 50 nm. The height of a projection is defined as the height measured in the depth direction of the projections and recesses of a master. The width of a projection is defined as the width that is perpendicular to the depth direction of the projections and recesses of a master.

Figure 2:
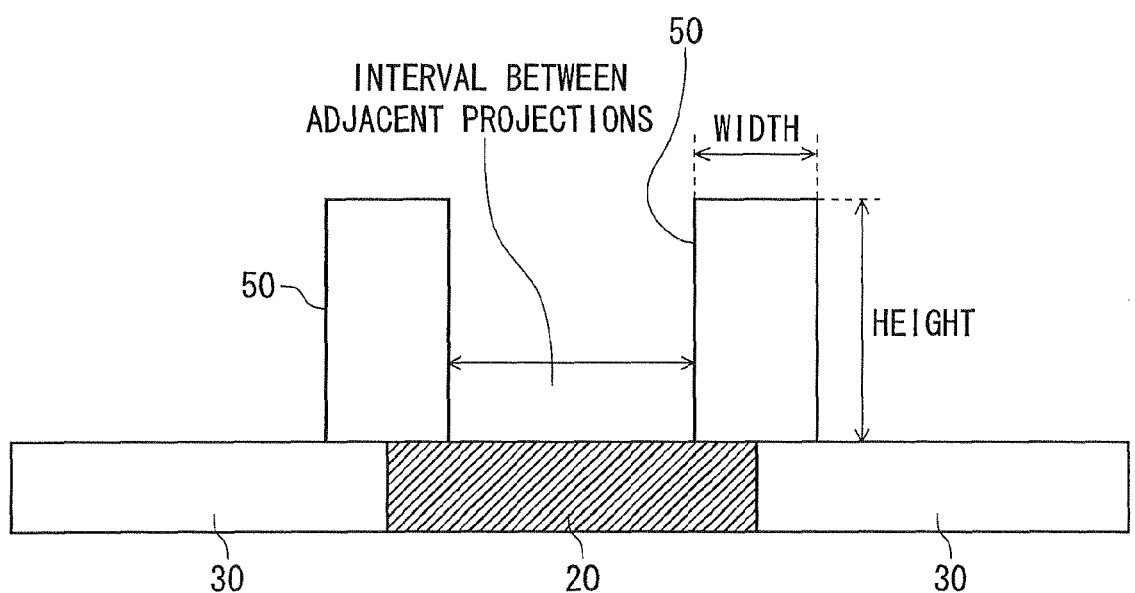
FIG. 2 illustrates the structure of the master.

It is preferable that the interval between adjoining projections 50 formed on the substrate 40 be 5 nm to 5 μm (see FIG. 2). Each projection 50 is located on the boundary between two portions made of the different materials 20 and 30.

Example materials of the projections 50 are silicon oxide, aluminum oxide, titanium oxide, and glass (mentioned above as candidates for the second material 30) and metals and metal nitrides such as silicon, aluminum, titanium, silicon nitride, aluminum nitride, and titanium nitride (i.e., materials other than the ones mentioned above as candidates for the second material 30).

Next, a producing method of a stamper 80 which uses the master 10 according to the embodiment will be described with reference to FIGS. 3-5.

Figure 3:
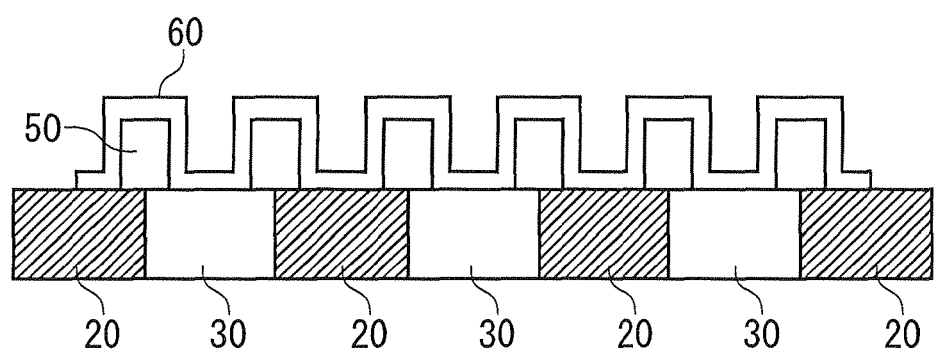
FIG. 3 is a first view illustrating a producing process of a stamper.

First, as shown in FIG. 3, the surface of the master 10 is coated with a conducting film 60 by sputtering or the like. For example, the conducting film 60 is made of Ni and is 5 Å in thickness.

Figure 4:
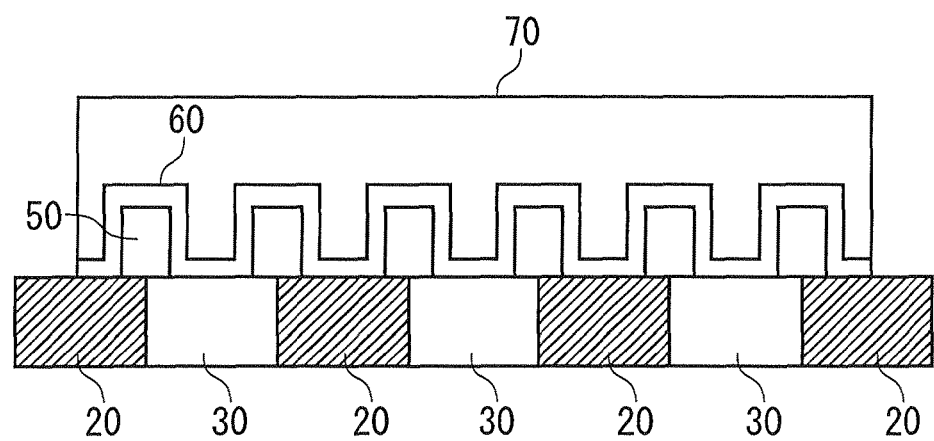
FIG. 4 is a second view illustrating the producing process of the stamper.

Then, as shown in FIG. 4, a Ni electroforming layer 70 of about 300 μm in thickness is formed by immersing the master 10 into a nickel sulfamate plating liquid and performing electroforming. The electroforming layer 70 and the conducting film 60 constitute a stamper 80.

Then, the stamper 80 which has a projection-recess pattern (see FIG. 5) is removed from the master 10.

The adhesion between the master 10 and the stamper 80 can be explained using the surface energies of their materials.

A free energy variation that occurs when the area of an interface is expanded by a unit area is known as an interface free energy. The interface free energy $\gamma_{AB}$ between materials A and B is given by the following Equation (1) using the surface free energies $\gamma_A$ and $\gamma_B$ of the materials A and B:

[Formula 1]

$$\gamma_{AB} = (\sqrt{\gamma_A} - \sqrt{\gamma_B})^2 \quad (1)$$

As the interface free energy $\gamma_{AB}$ increases, the total free energy increases, as a result of which the interface is rendered more unstable in a thermodynamic sense and the adhesion becomes lower.

Individual materials have the following surface energy values:

Silicon: 865 mJ/m$^2$
Silicon oxide: 200 to 260 mJ/m$^2$
Glass (NaSiO$_2$): 310 mJ/m$^2$
Aluminum oxide: 420 mJ/m$^2$
Titanium oxide: 320 mJ/m$^2$
Nickel: 1,778 mJ/m$^2$
Titanium: 1,650 mJ/m$^2$
Aluminum: 900 mJ/m$^2$ The adhesion between the master 10 and the stamper 80 increases as the difference between the surface energy values of the material of the master 10 and the material (nickel) of the stamper 80 decreases. As can be seen from the above list, the surface energy values of silicon oxide, aluminum oxide, titanium oxide, and glass are approximately in a range of 200 to 400 mJ/m$^2$ and the surface energy values of simple substances nickel and titanium are around 1,700 mJ/m$^2$. The surface energy of silicon, which is also a simple substance, is 865 mJ/m$^2$.

If the master 10 is made of only silicon oxide, the surface energy difference between the master 10 and the stamper 80 which is made of nickel is as large as 1,000 mJ/m$^2$. The adhesion between the master 10 and the stamper 80 is thus low. As a result, the conducting film 60 may peel off the master 10 because of, for example, stress that is caused by deposited metal during electroforming (the master 10 is immersed in a nickel sulfamate plating liquid). Since electroforming metal cannot be deposited in regions where portions of the conducting film 60 have peeled away, it becomes difficult to produce a stamper 80 to which the pattern of the master 10 has been transferred normally.

If the master 10 is made of a material (e.g., silicon) that provides high adhesion with the material of the stamper 80, the surface energy difference between the master 10 and the stamper 80 is made small and the adhesion between them is made high. Thus, electroforming can be performed without a failure due to partial peeling of the conducting film 60.

On the other hand, it becomes difficult to remove the stamper 80 from the master 10 because they adhere to each other too closely. If the stamper 80 is removed from the master 10 by applying an excessive load to it, projections of the stamper 80 are expanded locally and, as a result, transfer failures such as burrs may occur in the stamper 80. The term "burr" means a portion that sticks out locally from a virtual reference surface (located at an average position of the top surface) of a projection. Burrs are a cause of a height variation of the projections of the stamper 80.

In the embodiment, the substrate 40 of the master 10 is made of two different materials which are, for example, silicon which provides high adhesion with the material of the stamper 80 and silicon oxide which does not provide high adhesion with the material of the stamper 80. The material that provides high adhesion contributes to prevent the stamper 80 removing from the master 10 and hence prevents a resulting electrofortaing failure. On the other hand, in removing the stamper 80 from the master 10, portions that are not adhering to the stamper 80 strongly encourages the stamper 80 to be removed from the master 10, whereby the stamper 80 can be removed from the master 10 without applying an excessive load to the former, which is in contrast to the case of using only one kind of material that provides high adhesion with the material of the stamper 80.

Thus, burrs are prevented from occurring in the stamper 80 and height variation of the projections of the stamper 80 can be suppressed. As a result, high-quality stampers 80 can be produced to which the pattern of the master 10 has been transferred normally.

One of the portions made of the first material 20 and the portions made of the second material 30 need not be formed so as to reach the bottom of the substrate 40. In this case, the one portions occupy only surface regions of the substrate 40.

Next, a producing method of the master 10 will be described with reference to FIGS. 6 to 12B. It is assumed that the two materials of the substrate 40 are silicon and aluminum oxide and the material of the projections 50 is silicon oxide.

First, a resist layer 41 is formed on a silicon substrate 40 by spin coating, and the resist layer 41 is exposed with an electron beam using an exposing apparatus (not shown), and then developed. Thus, a pattern is formed in the resist layer 41 (see FIG. 6).

Figure 7:
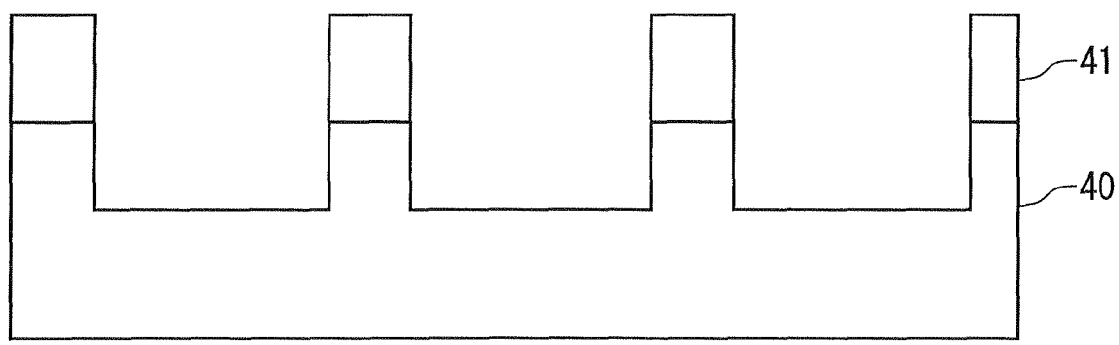
FIG. 7 is a second view illustrating the producing process of the master.

Then, as shown in FIG. 7, recesses are formed in the substrate 40 by etching it by RIE (reactive ion etching) using the patterned resist layer 41 as a mask and using an etching gas CF$_4$ or SF$_6$. The step of forming recesses in the substrate 40 is not indispensable for producing a master 10 according to the embodiment, and may be omitted in certain cases.

Figure 8:
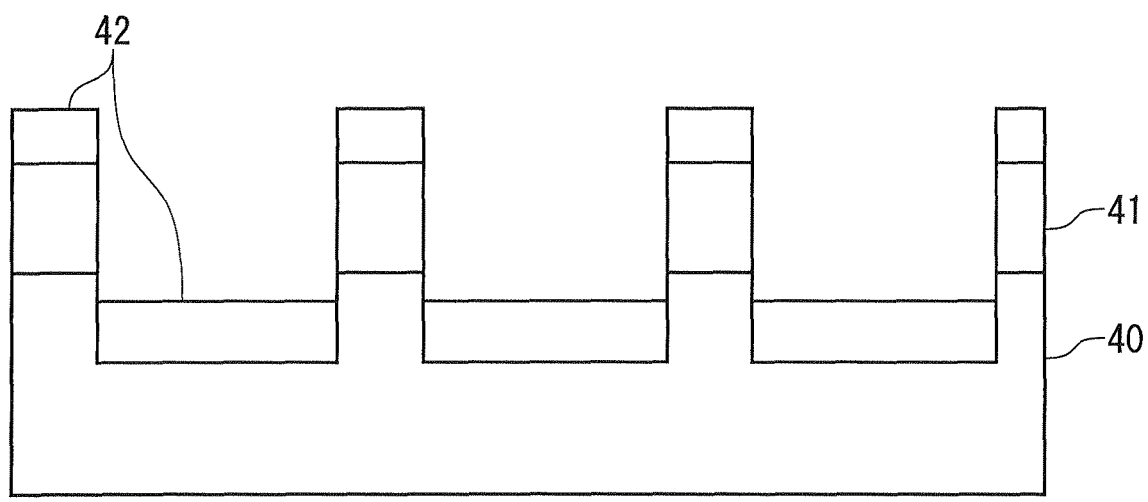
FIG. 8 is a third view illustrating the producing process of the master.

Then, as shown in FIG. 8, an aluminum oxide layer 42 is formed in the recesses of the substrate 40 and on the resist layer 41 formed on the projections of the substrate 40 by IBD (ion beam deposition). The thickness of the aluminum oxide layer 42 need not be completely equal to the depth of the recesses of the substrate 40.

Figure 9:
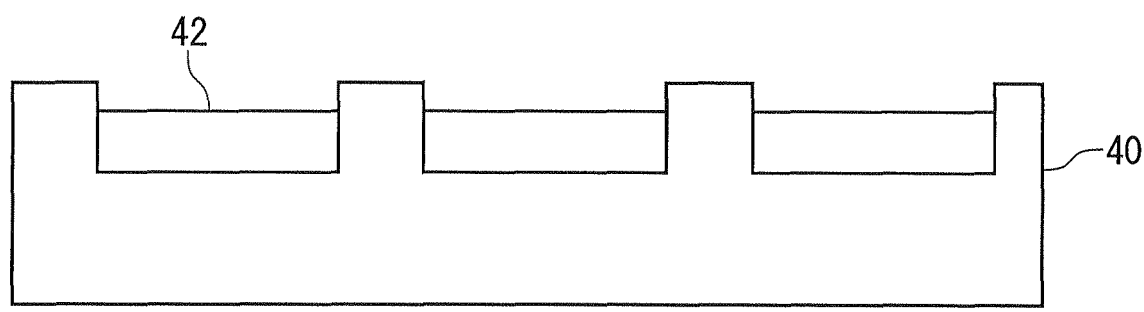
FIG. 9 is a fourth view illustrating the producing process of the master.

Then, as shown in FIG. 9, the resist layer 41 and those portions of the aluminum oxide layer 42 which are formed on the resist layer 41 are removed by a liftoff method. As a result, only those portions of the aluminum oxide layer 42 which are formed in the recesses of the substrate 40 remain. Chemical mechanical polishing may be performed to planarize the surface.

Figure 10:
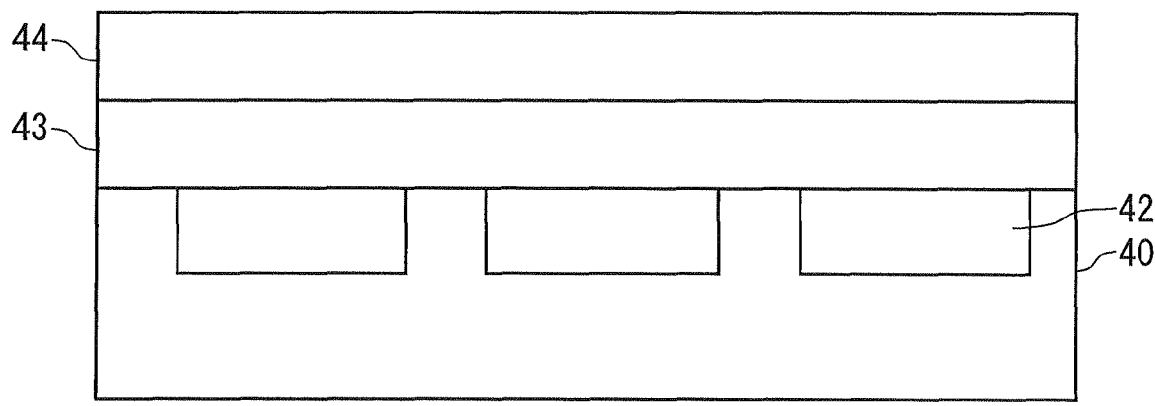
FIG. 10 is a fifth view illustrating the producing process of the master.

Then, as shown in FIG. 10, a silicon oxide layer 43 is formed on the aluminum oxide layer 42 and the substrate 40 by CVD (chemical vapor deposition) and a resist layer 44 is formed on the silicon oxide layer 43 by spin coating.

Figure 11:
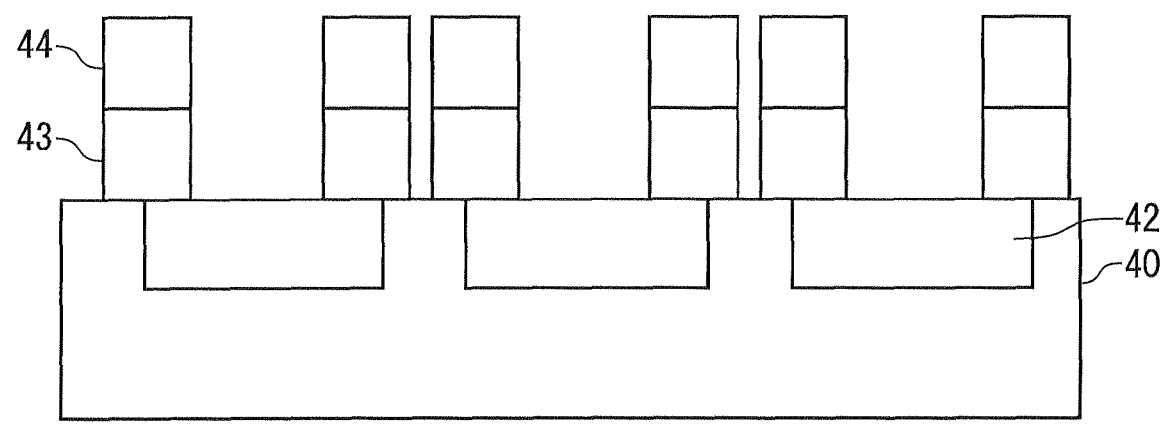
FIG. 11 is a sixth view illustrating the producing process of the master.

Then, the resist layer 44 is exposed with an electron beam using an exposing apparatus 44 (not shown) and developed thereby to produce a resist pattern. Then, as shown in FIG. 11, the silicon oxide layer 43 is etched to the surface of the substrate 40 by RIE using the patterned resist layer 44 as a mask and using an etching gas $CF_4$ or $SF_6$.

Figure 12A:
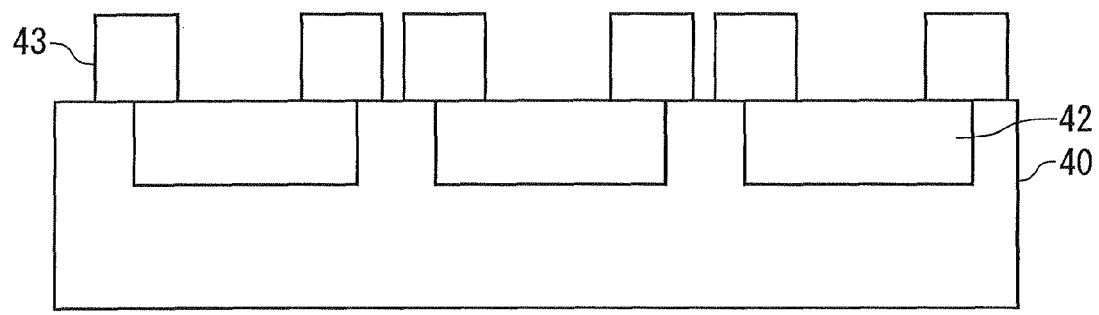
FIG. 12A is a seventh view illustrating the producing process of the master.

Finally, as shown in FIG. 12A, the resist layer 44 is removed by aching which uses oxygen plasma, whereby a master 10 is completed.

Figure 12B:
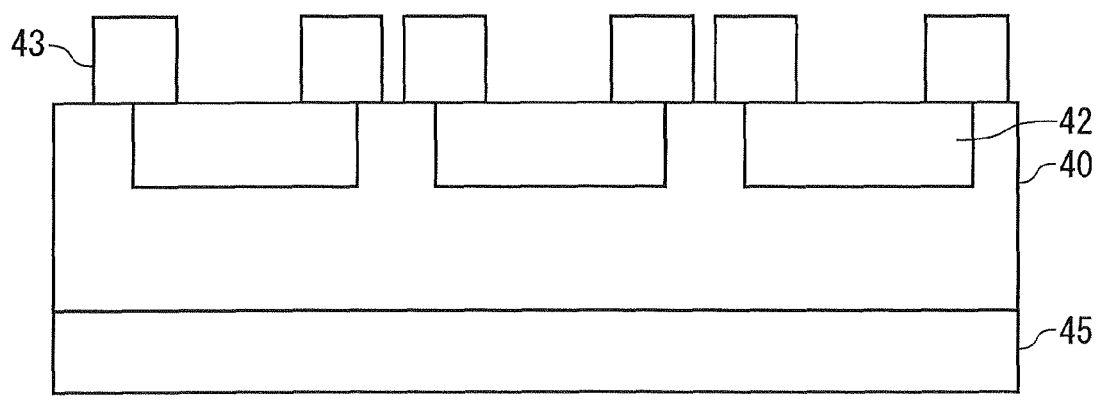
FIG. 12B shows a modified version of the master.

As shown in FIG. 12B, another substrate 45 may be formed under the substrate 40. The substrate 45 is made of silicon, silicon oxide, aluminum oxide, titanium oxide, glass, or the like.

Figure 13:
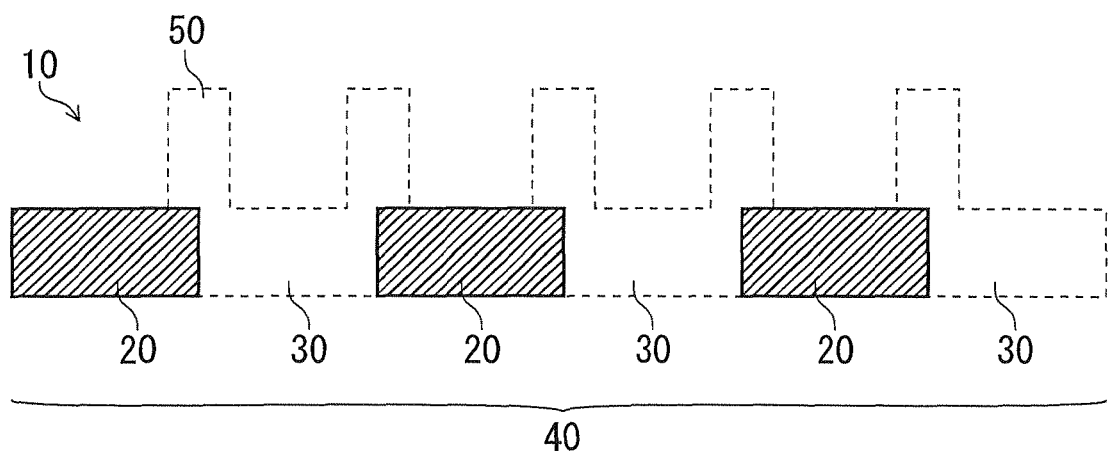
FIG. 13 shows another modified version of the master.

The embodiment can provide a master 10 which is superior in demoldability and producing stampers with less transfer failures using the master 10.

Where one of the two different materials 20 and 30 of the substrate 40 is the same as the material of the projections 50, portions made of that same material are formed as indicated by broken lines in FIG. 13. These portions prevent defects such as dislocations and cracks caused at interfaces between the substrate 40 and the projections 50 due to stress that is exerted when a stamper is removed from the master 10.

Embodiment 2

Figure 14:
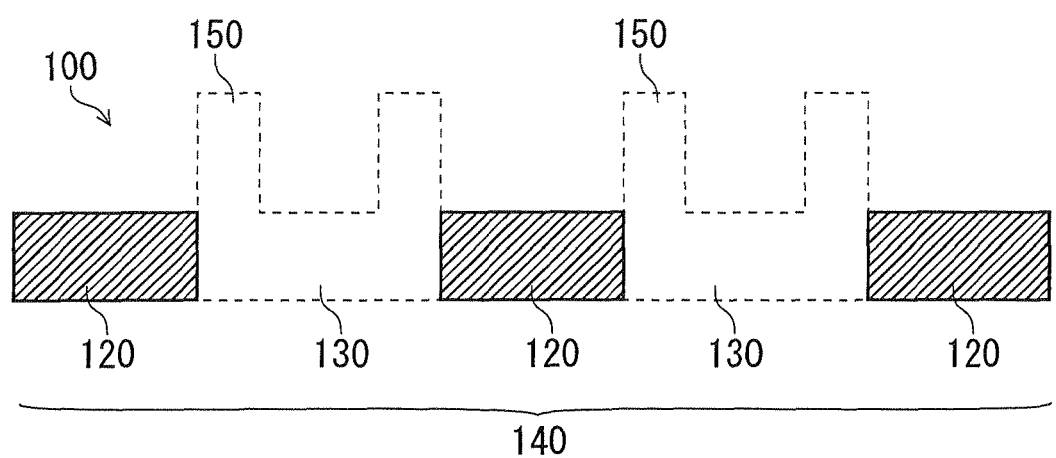
FIG. 14 shows a master for producing a stamper according to a second embodiment of the invention.

FIG. 14 shows a master 100 according to a second embodiment. The master 100 according to the second embodiment is different from master 10 according to the first embodiment in that one of two different materials (first material 120 and second material 130) of a substrate 140 is the same as the material of projections 150, and that the projections 150 are formed only on those portions of the substrate 140 which are made of the same material as the projections 150. In other words, the substrate 40 is made of the first material 120, at least surface portions of the substrate 140 are made of the second material 30, and the projections 150 are formed only on the surface portions. Alternatively, the substrate 140 may be made of the second material 30, at least surface portions of the substrate 140 are made of the first material 20, and the projections 150 are formed only on the surface portions. Members of the master 100 that have the same ones in the master 10 will not be described in detail.

The first material 120 is silicon and the second material 130 is one of silicon oxide, aluminum oxide, titanium oxide, and glass. The material of the projections 150 is the same as the first material 120 or the second material 130. The projections 150 are thus continuous with the substrate 140.

As a result, the master 100 is made more resistant to stress that is exerted on the projections 150 in a step of peeling a stamper from the master 100. In producing stampers, the projections 150 of the master 100 are made less likely to be removed from or fall over the substrate 40. As a result, more stampers can be produced repeatedly using a single master 100.

For the reasons described below, it is even preferable that the width of the projections 150 be smaller than or equal to 10 nm.

In general, when a stamper is removed from the master, external force acts on the projections laterally. If the width of the projections is smaller than or equal to 10 nm, the overlap area between the bottom surface of each projection and the top surface of the substrate is so small that projections formed between different materials may be removed from the substrate or fall over the substrate due to shearing stress acting on the interface between the bottom surface of each projection and the top surface of the substrate when the stamper is removed from the master.

In contrast, where one of the two different materials 120 and 130 is the same as the material of the projections 150 and the projections 150 are formed on those portions of the substrate 140 which are made of the same material as the projections 150, such defects (e.g., dislocations and cracks) as develop in the interface between different materials do not develop and hence the projections 150 are not likely to removed from or fall over the substrate even if the width of the projections 150 is smaller than or equal to 10 nm.

Even if the interface between each projection 150 and the substrate 140 is an interface between different materials, the projections 150 are not likely to be removed from or fall over the substrate 140 due to external force when an electroformed product is removed from as long as the width of the projections 150 is larger than 10 nm.

Next, a producing method of the master 100 will be described with reference to FIGS. 15-20. It is assumed that the two materials of the substrate 140 are silicon and silicon oxide.

Figure 15:
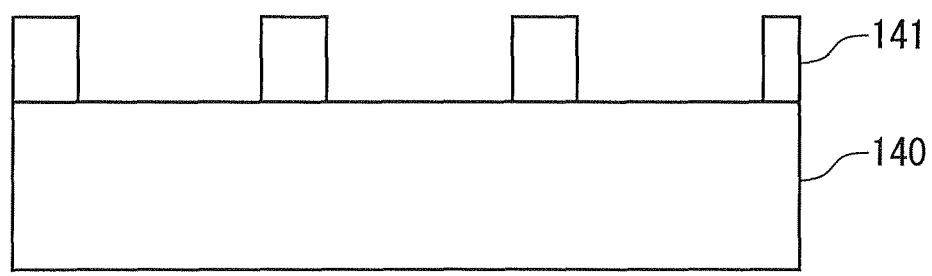
FIG. 15 a first view illustrating a producing process of the master.

First, a carbon layer 141 is formed on a silicon substrate 140 and patterned by lithography and RIE (see FIG. 15).

Figure 16:
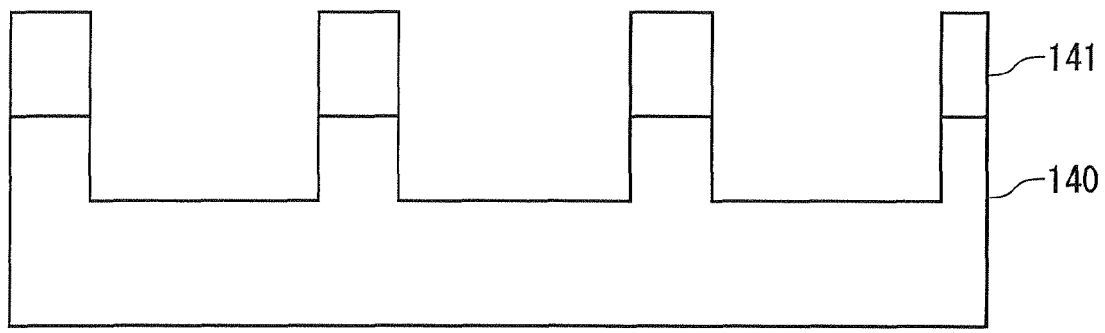
FIG. 16 is a second view illustrating the producing process of the master.

Then, as shown in FIG. 16, recesses are formed in the substrate 140 by etching it using the patterned carbon layer 141 as a mask. The step of forming recesses in the substrate 140 is not indispensable for producing of a master 100 according to the embodiment, and may be omitted in certain cases.

Figure 17:
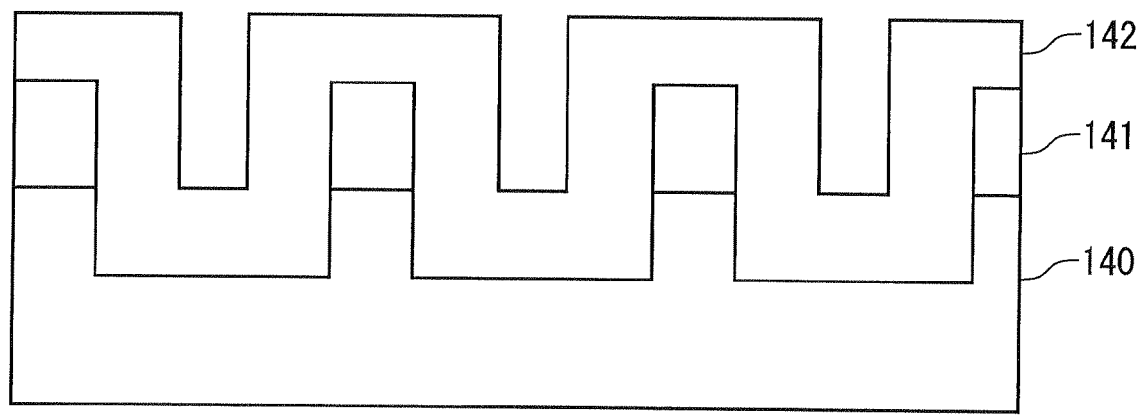
FIG. 17 is a third view illustrating the producing process of the master.

Then, as shown in FIG. 17, a silicon oxide layer 142 which corresponds to the second material 130 of the substrate 140 is deposited in the recesses of the substrate 140 and on the carbon layer 141 formed on the projections of the substrate 140 by ALD (atomic layer deposition). The thickness of the silicon oxide layer 142 need not be completely equal to the depth of the recesses of the substrate 140.

Figure 18:
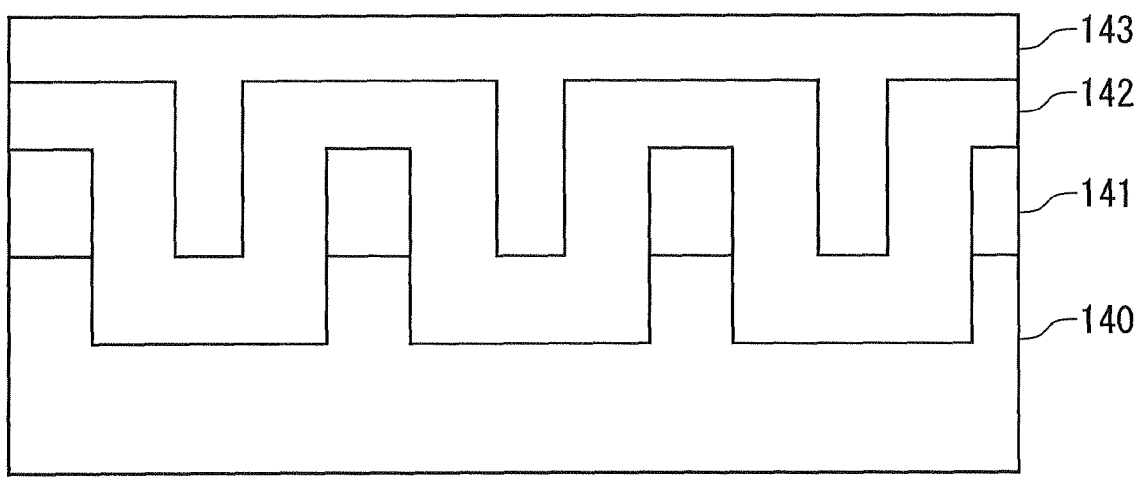
FIG. 18 is a fourth view illustrating the producing process of the master.

Then, as shown in FIG. 18, a plug layer 143 is formed on the silicon oxide layer 142. For example, the material of the plug layer 143 is carbon or an organic resin that is superior in producing a flat surface.

Figure 19:
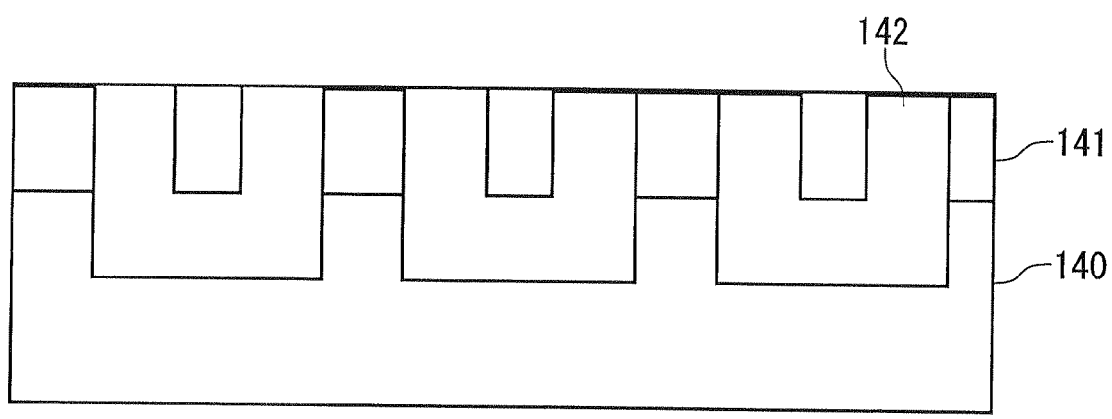
FIG. 19 is a fifth view illustrating the producing process of the master.

Then, as shown in FIG. 19, etching is performed uniformly by RIE or ion milling until the top surface of the carbon layer 141 is exposed.

Figure 20:
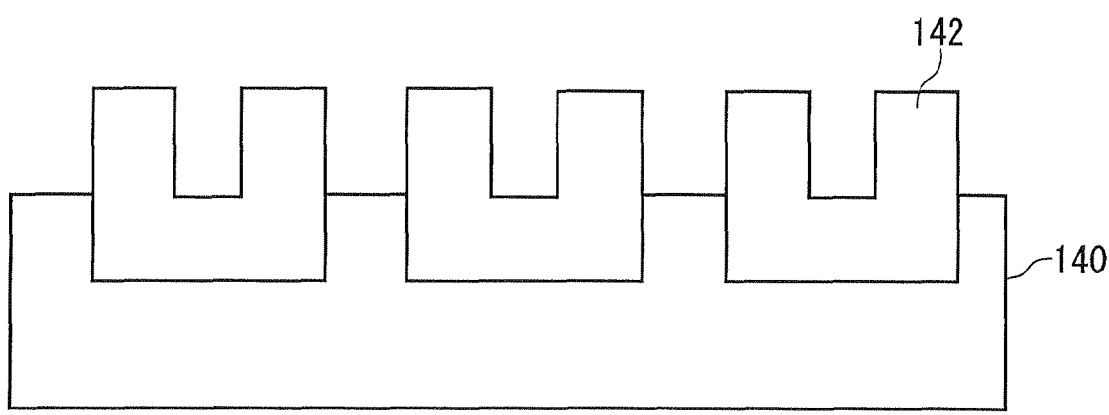
FIG. 20 is a sixth view illustrating the producing process of the master.

Finally, as shown in FIG. 20, the carbon layer 141 and the plug layer 143 are removed, whereby a master 100 is completed.

Figure 21:
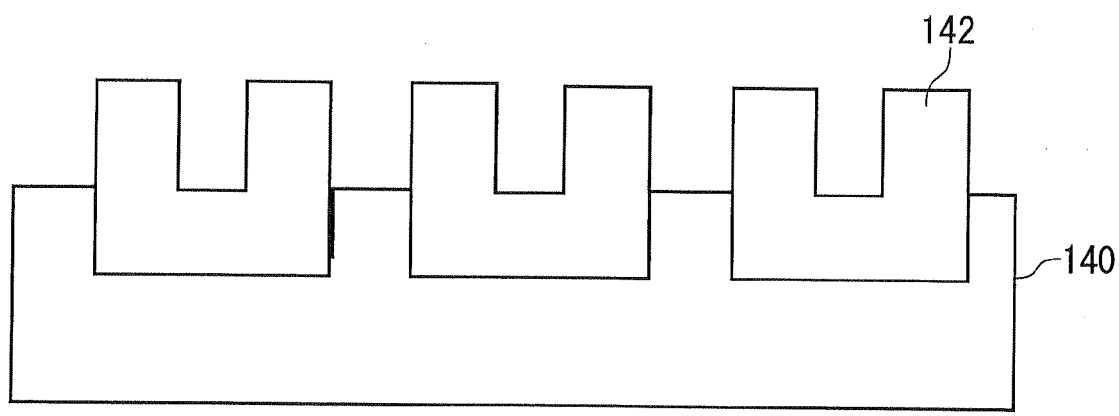
FIG. 21 shows a modified version of the master.

As shown in FIG. 21, the master 100 may be such that the bottom surfaces of the recesses of the silicon oxide layer 142 may be lower than the top surface of the substrate 140.

Figure 22:
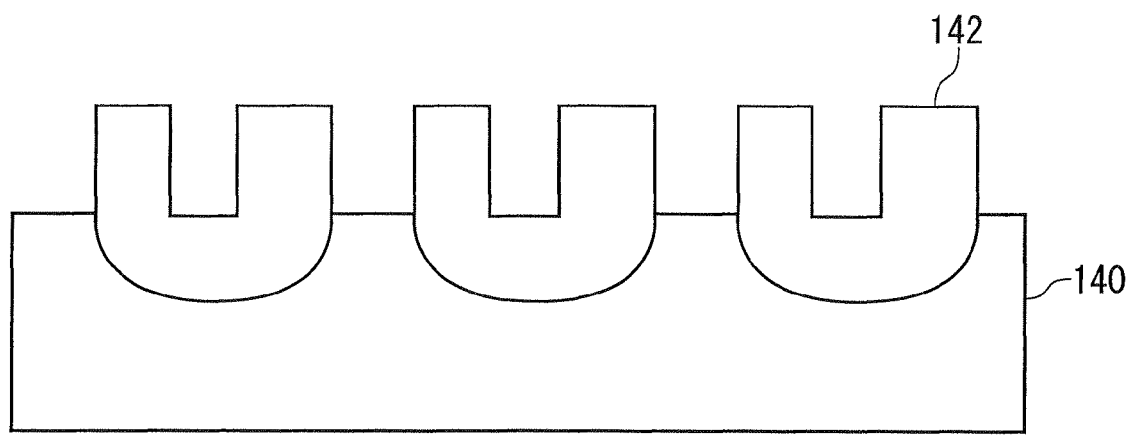
FIG. 22 shows another modified version of the master.

In the embodiment, the bottom surfaces of the silicon oxide layer 142 have right-angled edges. Alternatively, bottom portions of the silicon oxide layer 142 may be curved as shown in FIG. 22.

The embodiment prevents dislocations and cracks from developing at the interfaces between the substrate 140 and the projections 150, and hence can provide a master 100 which is high in durability.

The master 100 can also be produced by a double exposing method as described in the first embodiment, and another deposition method such as CVD (chemical vapor deposition) or MBE (molecular beam epitaxy).

The master 10 according to the first embodiment and the master 100 according to the second embodiment can be used for producing discrete track recording (DTR) media or bit patterned media (BPM).

Example 1

Masters 100 according to the first embodiment were produced according to the method that has been described above with reference to FIGS. 6-12A.

A resist layer 41 was formed on a silicon substrate 40 by spin coating and patterned by electron beam lithography. The line width of the resist pattern was 40 nm.

Then, recesses were formed in the substrate 40 at a depth of 10 nm by etching it by RIE (reactive ion etching) using the patterned resist layer 41 as a mask and using a $CF_4$ gas.

Then, a 10-nm-thick aluminum oxide layer 42 was formed in the recesses of the substrate 40 and on the resist layer 41 formed on the projections of the substrate 40 by IBD (ion beam deposition).

Then, those portions of the aluminum oxide layer 42 which are formed on the resist layer 41 were removed by a liftoff method.

Then, a 15-nm-thick silicon oxide layer 43 was formed on the aluminum oxide layer 42 and the substrate 40 by CVD (chemical vapor deposition).

A resist layer 44 was formed on the silicon oxide layer 43 by spin coating. Then, the resist layer 44 was patterned by electron beam lithography so that resist patterns having a line width 10 nm were formed at the silicon-aluminum oxide boundary lines on the surface of the substrate 40.

Then, the silicon oxide layer 43 was etched to the surface of the substrate 40 by RIE using the patterned resist layer 44 as a mask and using a $CF_4$ gas.

Finally, the resist layer 44 was removed by ashing which used oxygen plasma, whereby a master 10 of Example 1 was completed.

In the masters 10 of Example 1, the materials of the substrate 40 were silicon and aluminum oxide and the material of the projections 50 was silicon oxide. An AFM (atomic force microscope) measurement showed that the average height of the projections 50 of the masters 10 was 15.0 nm and their height variation was 0.4 nm in terms of $3\sigma$. The width of the projections 50 of the masters 10 was 10 nm.

As for the height variation of the projections 50 in terms of $3\sigma$, 99.7% of measured height values of the projections 50 exist in a $\pm 3\sigma$ range centered by the average height.

Figure 5:
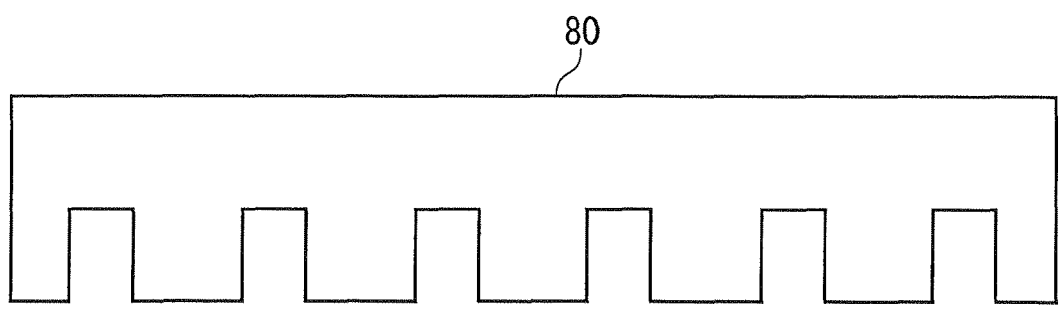
FIG. 5 is a third view illustrating the producing process of the stamper.
Figure 6:
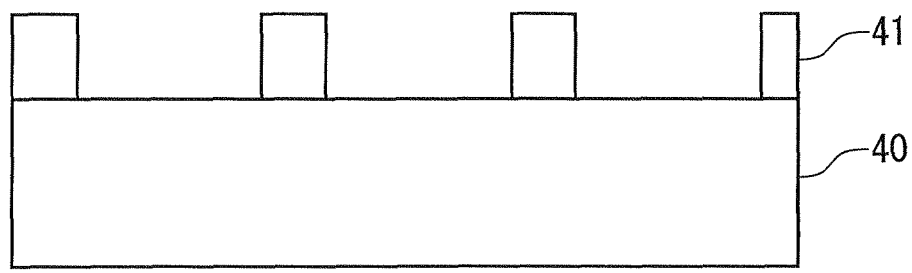
FIG. 6 is a first view illustrating a producing process of a master for producing the stamper.

Ni stampers 80 were produced by the method shown in FIGS. 3-5 using the produced masters 10.

The surface of the master 10 was coated with a Ni conducting film 60 by sputtering.

Then, a Ni electroforming layer 70 of about 300 μm in thickness was formed by immersing the master 10 into a nickel sulfamate plating liquid and performing electroforming. No peeling or the like of the conducting film 60 occurred during the electroforming. The electroforming layer 70 and the conducting film 60 constituted a Ni stamper 80.

Then, the Ni stamper 80 was removed from the master 10. The patterns of the stamper 80 were evaluated with an AFM. The average height of the patterns was 15.2 nm. This value deviates from the average height of the projections 50 of the master 10 by 0.2 nm, which is a piece of evidence that the projection-recess pattern of the master 10 was transferred to the Ni stamper 80 satisfactorily.

The height variation of the patterns in terms of $3\sigma$ was 0.7 mm. This value is different from the height variation ($3\sigma$) of the projections 50 of the master 10 by 0.3 nm, which is another piece of evidence that the projection-recess pattern of the master 10 was transferred to the Ni stamper 80 satisfactorily.

Comparative Example 1

Masters were produced by the same method as in Example 1 except that glass was used as one material of the substrate. In the masters of Comparative Example 1, the materials of the substrate were glass and aluminum oxide and the material of the projections was silicon oxide. An AFM measurement showed that the average height of the projections of the masters was 15.0 nm and their height variation was 0.3 nm in terms of $3\sigma$. The width of the projections of the masters was 10 nm.

It was attempted to produce Ni stampers by the method shown in FIGS. 3-5 using the produced masters.

The surface of the master was coated with a Ni conducting film 60 by sputtering.

Then, Ni electroforming was performed by immersing the master into a nickel sulfamate plating liquid. The conducting film peeled away during the electroforming and the producing of a Ni stamper thus failed.

Comparative Example 2

Masters were produced by the same method as in Example 1 except that the materials of the substrate were silicon and aluminum and the material of the projections was silicon oxide. An AFM measurement showed that the average height of the projections of the masters was 15.0 nm and their height variation was 0.4 nm in terms of $3\sigma$. The width of the projections of the masters was 10 nm.

Ni stampers were produced by the method shown in FIGS. 3-5 using the produced masters.

The surface of the master was coated with a Ni conducting film 60 by sputtering.

Then, a Ni electroforming layer 70 of about 300 μm in thickness was formed by immersing the master into a nickel sulfamate plating liquid and performing electroforming. No peeling or the like of the conducting film 60 occurred during the electroforming. The electroforming layer 70 and the conducting film 60 constituted a Ni stamper 80.

Then, the Ni stamper 80 was removed from the master starting from its end position. The patterns of the stamper 80 were evaluated with an AFM. The average height of the patterns was 21.6 nm. This value deviates from the average height of the projections 50 of the master by 5.6 nm, from which it is seen from a comparison with the result of Example 1 that the projection-recess pattern of the master was not transferred to the Ni stamper 80 satisfactorily.

The height variation of the patterns in terms of $3\sigma$ was 8.4 mm. This value is different from the height variation ($6\sigma$) of the projections of the master by 8.0 nm, from which it is also seen from a comparison with the result of Example 1 that the projection-recess pattern of the master was not transferred to the Ni stamper 80 satisfactorily.

Example 2

Masters 100 according to the first embodiment were produced.

In the masters 10 of Example 2, one of the two materials of the substrate 40 was silicon (Si) or glass (NaSiO$_2$) and the other was selected from silicon, silicon oxide (SiO$_2$), and titanium oxide (TiO$_2$). The other conditions were the same as in Example 1. However, in each of the steps for producing a master 10, process conditions that were suitable for each combination of materials were employed.

The material of the projections 50 was aluminum oxide only in the case where the materials of the substrate 40 were silicon and silicon oxide. In the other cases, the material of the projections 50 was silicon oxide. The width and the height of each projection 50 of the master 10 were set at 10 nm and 15 nm, respectively.

Ni stampers 80 were produced using the produced masters 10.

FIG. 23 shows AFM observation results of the average height and the height variation of the projections 50 of the masters 10 and the average height and the height variation of the patterns of the Ni stampers 80 produced using the masters 10.

The masters 10 were produced by selecting, in the above-described manner, the materials of the substrate 10 and the projections 50 from silicon, (Si), glass (NaSiO$_2$), titanium oxide (TiO$_2$), aluminum oxide (Al$_2$O$_3$), and silicon oxide (SiO$_2$).

In FIG. 23, the column "Ni conducting film" shows whether or not Ni electroforming was performed successfully without peeling of the Ni conducting film 60 when a stamper 80 was produced using a master 10.

As shown in FIG. 23, the average height values of the patterns of the Ni stampers 80 deviates from those of the projections 50 of the masters 10 only by about 0.3 to 0.5 nm. And the height variations of the patterns of the Ni stamper 80 are different from those of the projections 50 of the masters 10 only by about 0.3 mm. Thus, it is confirmed that the projection-recess patterns of the masters 10 were transferred to the Ni stampers 80 satisfactorily.

As shown in FIG. 23, no electroforming failure occurred due to peeling of a Ni conducting film 60.

Example 3

Masters 100 according to the second embodiment were produced according to the method that has been described above with reference to FIGS. 15-20.

First, a 15-nm-thick carbon layer 141 was formed on a substrate 140 by CVD.

The carbon layer 141 was patterned by lithography and RIE. The line width and the pitch of resulting carbon patterns were 30 nm and 80 nm, respectively.

Then, recesses were formed in the substrate 140 by etching the substrate 140 using the patterned carbon layer 141 as a mask.

Then, a 10-nm-thick silicon oxide layer 142 which corresponds to the second material 130 and the projections 150 of the substrate 140 was deposited in the recesses of the substrate 140 and on the side surfaces and the top surfaces of the carbon patterns formed on the substrate 140 by ALD (atomic layer deposition).

Then, a plug layer 143 was formed with carbon on the silicon oxide layer 142.

Then, etching was performed uniformly by ion milling until the top surface of the carbon layer 141 was exposed.

Finally, the carbon layer 141 and the plug layer 143 were removed, whereby a master 100 of Example 2 was completed.

In the master 100 of Example 2, the materials of the substrate 140 were silicon and silicon oxide and the material of the projections 150 was silicon oxide. That is, the master 100 of Example 2 is characterized in that one of the materials of the substrate 140 is the same as the material of the projections 150.

An AFM measurement showed that the average height of the projections 150 of the masters 100 was 15.2 nm and their height variation was 0.6 nm in terms of 3σ. The width of the projections 150 of the masters 100 was 10 nm.

Ni stampers 80 were produced by the method shown in FIGS. 3-5 (i.e., in the same manner as in Example 1) using the produced masters 100. Ni stampers 80 were produced successfully without peeling of a conducting film 60 during electroforming.

The patterns of the Ni stampers 80 were evaluated with an AFM. The average height of the patterns was 15.4 nm. This value deviates from the average height of the projections 150 of the master 100 by 0.2 nm, which is a piece of evidence that the projection-recess pattern of the master 100 was transferred to the Ni stampers 80 satisfactorily. The height variation of the patterns in terms of 3σ was 0.8 mm. This value is different from the height variation (3σ) of the projections 150 of the master 100 by 0.2 nm, which is another piece of evidence that the projection-recess pattern of the master 100 was transferred to the Ni stamper 80 satisfactorily.

The results of Example 3 show that the conducting film 60 can be prevented from peeing away during producing of a Ni stamper 80 even in the case where one of the materials of the substrate is the same as the material of the projections, and that the projection-recess pattern of the master 100 can be transferred to the Ni stamper 80 satisfactorily.

The results of Examples 1-3 show that the master according to the invention in which one of the materials of the substrate is silicon and the other is selected from silicon oxide, aluminum oxide, titanium oxide, and glass is suitable for Ni electroforming, and that the projection-recess pattern of the master can be transferred to a Ni stamper with high accuracy.

Example 4

Masters 100 according to the second embodiment were produced. The width of the projections 150 of the master 100 was set at 5 nm, 10 nm, 15 nm, and 50 nm. The other conditions were the same as in Example 3. A Ni stamper 80 was produced 10 times repeatedly using each single master 100 thus produced. Then, the shape of each master 100 was observed with an AFM.

Comparative Example 3

Masters 10 according to the first embodiment were produced. The width of the projections 50 was set at 5 nm, 10 nm, 15 nm, and 50 nm. The other conditions were the same as in Example 1. A Ni stamper 80 was produced 10 times repeatedly using each single master 10 thus produced. Then, the shape of each master 10 was observed with an AFM.

FIG. 24 shows AFM measurement results, that is, the numbers of peeled projections on the surface of each master that were found after repetitive producing of Ni stampers 80 (10 times). A 1-μm-square measurement range was set on the surface of each master. Measurements were performed on the masters 100 and 10 of Example 4 and Comparative Example 3.

For all the masters 100 of Example 4 having the projection widths 5 nm, 10 nm, 15 nm, and 50 nm, no peeled projection was found in the 1-μm-square measurement range.

On the other hand, peeled projections were found in the masters 10 of Comparative Example 3 having the projection widths 5 nm and 10 nm.

The results of Comparative Example 3 show that the durability of the projections 50 of the master 10 is low when the width of the projections 50 of the master 10 is smaller than or equal to 10 nm.

The results of Example 4 show that the durability of the projections of the master is high if one of the two different materials 120 and 130 is the same as the material of the projection 150 and the projections 150 are formed on those portions of the substrate 140 which are made of the same material as the projections 150. That is, such a master 100 is highly durable for producing of Ni stampers 80.

Although the several embodiments of the invention have been described above, they are just examples and should not be construed as restricting the scope of the invention. Each of these novel embodiments may be practiced in other various forms, and part of it may be omitted, replaced by other elements, or changed in various manners without departing from the spirit and scope of the invention. These modifications are also included in the invention as claimed and its equivalents.

What is claimed is:

1. A master for producing a stamper, the master comprising:
    a substrate made of a first material and comprising a first surface, wherein the first surface of the substrate is formed with a groove;
    a first layer made of a second material and formed in the groove, wherein the second material is different from the first material, and wherein a surface of the first layer is substantially flush with the first surface of substrate; and
    a projection portion formed on at least one of the first surface of the substrate and the surface of the first layer, wherein the first material is silicon and the second material is selected from silicon oxide, aluminum oxide, titanium oxide, and glass.

2. The master of claim 1, wherein the projection portion is made of a material selected from silicon, silicon oxide, aluminum oxide, titanium oxide, and glass.

3. The master of claim 1, wherein the projection portion is formed on the first surface of the substrate and on the surface of the first layer so as to extend the substrate and the first layer.

4. The master of claim 1, wherein the projection portion is formed on only the surface of the first layer.

5. The master of claim 1, wherein the projection portion is formed on only the first surface of the substrate.

6. The master of claim 4, wherein the projection portion is made of the same material as the second material.

7. The master of claim 5, wherein the projection portion is made of the same material as the first material.

8. The master of claim 4 wherein a width of the projection portion is smaller than or equal to 10 nm.

9. The master of claim 1, wherein the first layer comprises a plurality of first layers, and the projection portion comprises a plurality of projection portions,
    wherein each of the projection portions is formed on the first surface of the substrate and on the surface of a corresponding one of the first layers so as to extend the substrate and the corresponding first layer.

10. The master of claim 4, wherein the first layer comprises a plurality of first layers, and the projection portion comprises a plurality of projection portions,
    wherein each of the projection portions is formed on only the surface of a corresponding one of the first layers.

* * * * *